United States Patent

Garbagnati et al.

[11] Patent Number: 6,073,754
[45] Date of Patent: Jun. 13, 2000

[54] MAGNETIC CURVES WITH IMPROVED MAGNETIC FIELD FOR CONVEYORS

[75] Inventors: Carlo Garbagnati, Castello Brianza; Norberto Cattaneo, Cinisello Balsamo, both of Italy

[73] Assignee: Regina Sud S.p.A., Borgo San Michele, Italy

[21] Appl. No.: 09/266,812

[22] Filed: Mar. 12, 1999

[30] Foreign Application Priority Data

Dec. 24, 1998 [IT] Italy ................................ MI98A2827

[51] Int. Cl.[7] ................................................ B65G 23/18
[52] U.S. Cl. ................................................ 198/805
[58] Field of Search ........................................ 198/805

[56] References Cited

U.S. PATENT DOCUMENTS

| | | | |
|---|---|---|---|
| 4,643,298 | 2/1987 | Wallaart | 198/805 |
| 4,742,906 | 5/1988 | Wallaart | 198/805 |
| 5,027,942 | 7/1991 | Wallaart | 198/805 |
| 5,199,551 | 4/1993 | Wallaart et al. | 198/805 |

FOREIGN PATENT DOCUMENTS

| | | |
|---|---|---|
| 0159074 | 10/1985 | European Pat. Off. . |
| 0509605 | 10/1992 | European Pat. Off. . |

*Primary Examiner*—James R. Bidwell
*Attorney, Agent, or Firm*—Stevens, Davis, Miller & Mosher, LLP

[57] ABSTRACT

Magnetic curves for chain conveyors, comprising at least one path of travel and a plurality of magnets housed below the path of travel in a groove extending in the extension direction of the curve. The plurality of magnets is divided at least into magnets of a first length and magnets of a second length.

9 Claims, 6 Drawing Sheets

PRIOR ART

MAGNETIC CURVES WITH IMPROVED MAGNETIC FIELD FOR CONVEYORS

BACKGROUND OF THE INVENTION

The present invention relates to innovative curves and series of curves for conveyors, of the type having magnets fitted therein for keeping a conveyor chain in place. Curves for chain transporting installations are known which are provided with pockets or cavities in which magnets identical with each other are fitted and to which said magnets are differently fastened along the whole extension of a guide. For example, curves have been proposed in which a plurality of cavities, spaced apart the same distance along the guide extension, are formed in the guide body and in each cavity an identical magnet is housed. Curves of this type are shown in European Patents EP 0 159 074 and EP 0 509 605, for example.

It has been found however that by adopting known solutions the conveyor travelling over a curve is subjected to wobbling, jerks and in general to variations in the pulling force that do not appear to be directly due to the mechanical features of the sliding surfaces alone.

In accordance with the present invention, this is to be ascribed to irregularities in the magnetic field caused by an inappropriate distribution of the magnets as proposed in known chains. It is also to take into consideration the fact that, in order to optimise production, full series of curves having different extensions, radii of curvature, etc. employ the same magnet size.

The general object of the present invention is to obviate the above mentioned drawbacks by providing magnetic curves having improved sliding features enabling a more satisfactory distribution of the magnetic field. It is a further object of the invention to obtain a satisfactory distribution of the field in curves of different extension and geometry with use of a limited number of different typologies of magnets, so as to standardise construction of curve series.

SUMMARY OF THE INVENTION

In view of the above objects, in accordance with the invention, a magnetic curve for chain conveyors has been devised which comprises at least one path of travel and holding grooves for a plurality of magnets, characterised in that in the extension direction of the curve the magnets of the magnet plurality are housed in a continuous groove associated with said path of travel and the plurality of magnets is divided at least into magnets of a first length and magnets of a second length.

Still in accordance with the invention, accomplishment has been devised of a series of curves different in length, radius of curvature, number of paths of travel, each curve being made as above described, characterised in that said first and second lengths are the same for all curves of the series.

BRIEF DESCRIPTION OF THE DRAWINGS

For better explaining the innovatory principles of the present invention and the advantages it offers over the known art, possible embodiments applying said innovative principles will be given hereinafter, by way of non-limiting example, with the aid of the accompanying drawings. In the drawings:

FIG. 7 is a diagrammatic section view of the curves in accordance with the invention.

DETAILED DESCRIPTION OF THE INVENTION

According to the invention it has been found that in order to optimise the magnetic field along the curve extension, use of a plurality of magnets is required, which plurality is formed of at least two different magnet typologies, different from each other for a different extension in the sliding direction of the curve.

In other words, it has been found that, by using combinations of magnets at least of a first length and of a second length a distribution of the field can be achieved along the curve extension that makes chain sliding more uniform. In particular, the field can be made more uniform as compared with the field present in known curves. This is in particular possible in multi-path curves where the number of magnets used is maintained limited in spite of the high difference in length between the innermost and the outermost paths.

In accordance with the invention it has been found particularly advantageous, for achieving the intended purposes, that lengths Lm of the employed magnets should satisfy the relation:

$$1 < L/Lm <= 5$$

wherein L is the longest magnet among all magnets present. It has been found particularly advantageous for the magnets not to be spaced apart more than half their length from each other.

It has been also found advantageous that, by ideally dividing the whole curve into circular sectors being multiples of a preestablished angle, magnets of different length should be distributed in each sector in such a manner that they are not placed astride the division. It is therefore necessary to pass to a different combination of magnets of preestablished lengths for each change of radius of curvature that would involve the need for placing a magnet along the curve extension with infringement of the above rule. The following examples will make the above explanation more apparent. A particularly advantageous angle for circular sectors has been found to be included between 6.5° and 9°, being in particular about 7.5°.

With magnets in accordance with the invention optimisation of the field can be obtained with only two typologies of magnets for a high range of curves different from each other as regards length, radius of curvature, etc. This enables standardisation of the magnets for complete curve series.

Figure 1:
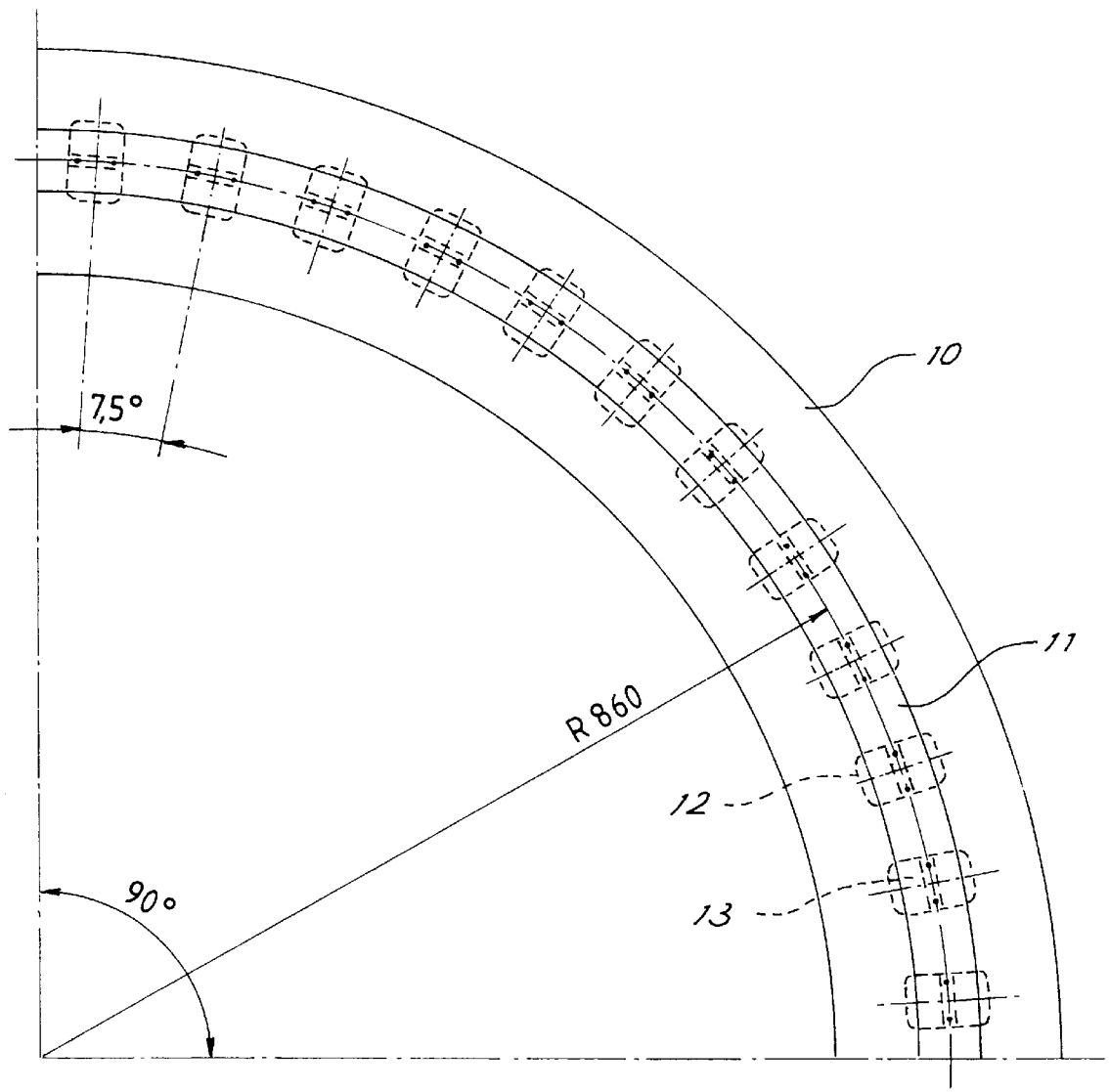
FIG. 1 is a diagrammatic plan view of a curve made in accordance with the known art.

With reference to FIG. 1, a curve of known art has been shown in which a body 10 has a sliding channel 11 under which individual pockets 12 are present that are spaced apart the same distance and each of which holds an identical magnet 13.

Figure 2:
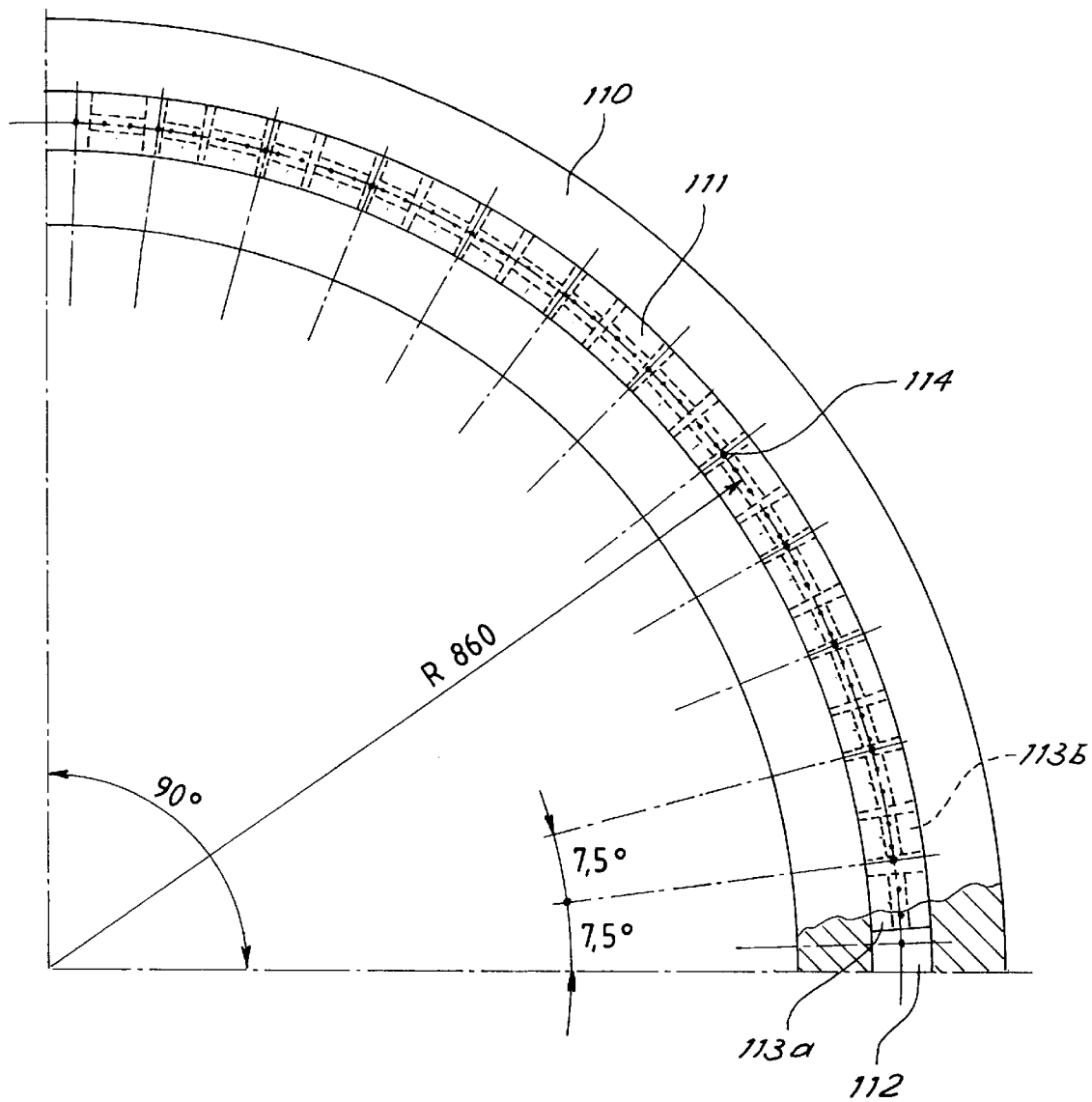
FIG. 2 is a view of a curve similar to that in FIG. 1 but applying the innovative principles of the present invention.

Shown in FIG. 2 is a curve similar in sizes to that in FIG. 1, but made in accordance with the present invention. This curve comprises a body 110 defining a sliding channel 111, under which there is a continuous channel 112 for housing a plurality of magnets of a first length 113a and of a second length 113b according to the above described relation. As shown in FIG. 7, magnets are formed of a first magnet element 115 which is more internal to the curve and a second magnet element 116 which is more external to the curve, said magnets being mounted to the ends of a plate of ferromagnetic material 117 extending transversely of the path of travel and below it.

As viewed from FIG. 2, magnets do not fall on the circular sector divisions, although they fill sectors in a satisfactory manner. Advantageously, screws 114 for guide fastening can be disposed along the circular sector divisions, i.e. at a region devoid of magnets.

Figure 3:
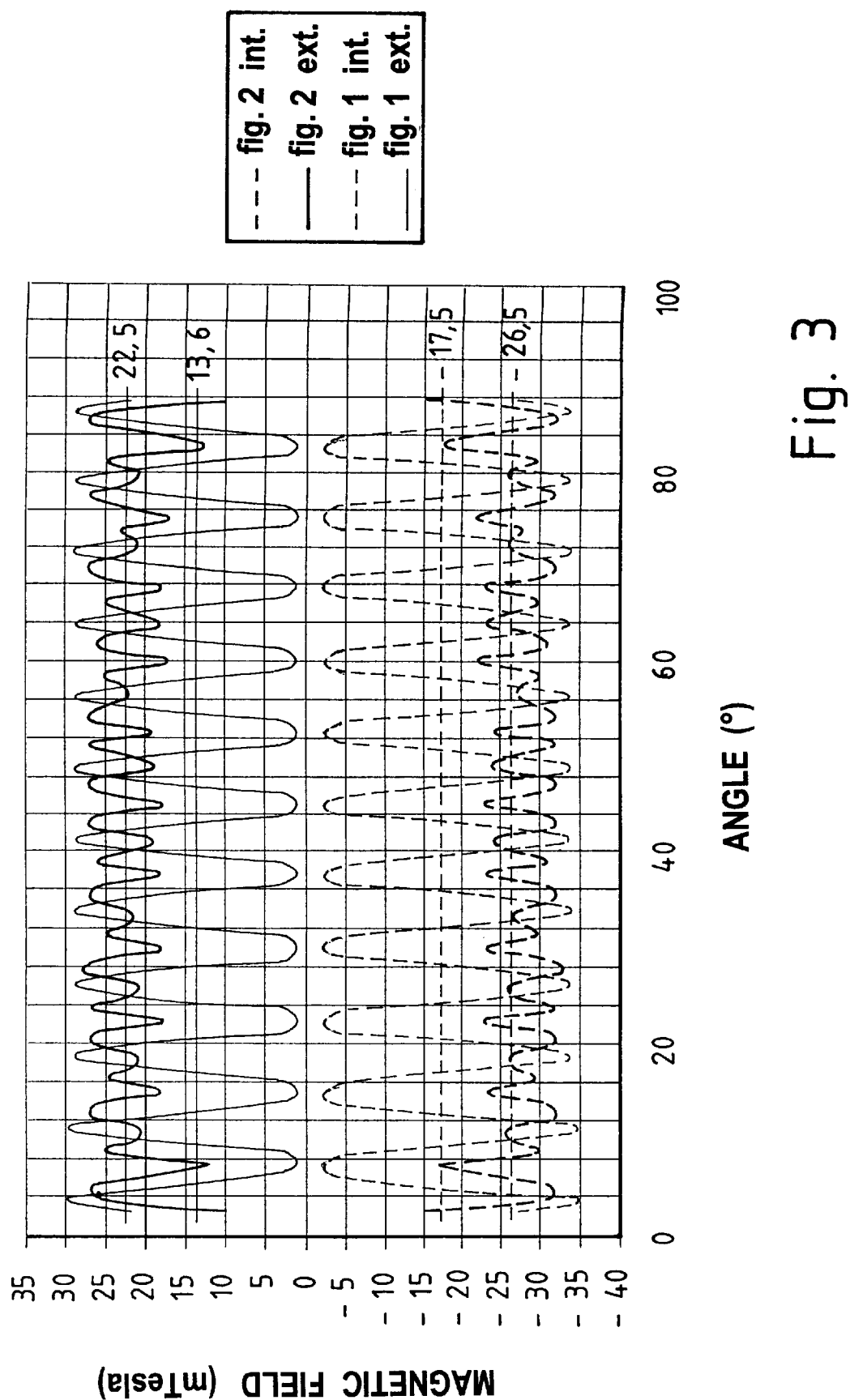
FIG. 3 is a comparative chart of the course of the magnetic field in the curves of FIGS. 1 and 2.

Shown in thicker chain line in FIG. 3 is the course along the curve of the field produced by the inner magnets and in thicker solid line the field of the outer magnets for the curve in FIG. 2. Shown in thinner chain and solid lines respectively are the corresponding courses for the curve in FIG. 1. The substantial uniformity of the field in the curve according to the invention as compared with the curve of the known art can be immediately verified. It has been found that in order to have satisfactory features in the conveyor movement, oscillations of the field along the curve extension must be maintained at about +-50% maximum of the average value substantially along the whole curve extension. In the curve of the known art shown in FIG. 1 oscillations reach +-100%.

It is possible to see that, in particular in the solutions employing separate pockets for each magnet, the magnetic field distribution is unsatisfactory and cannot be improved.

Figure 4:
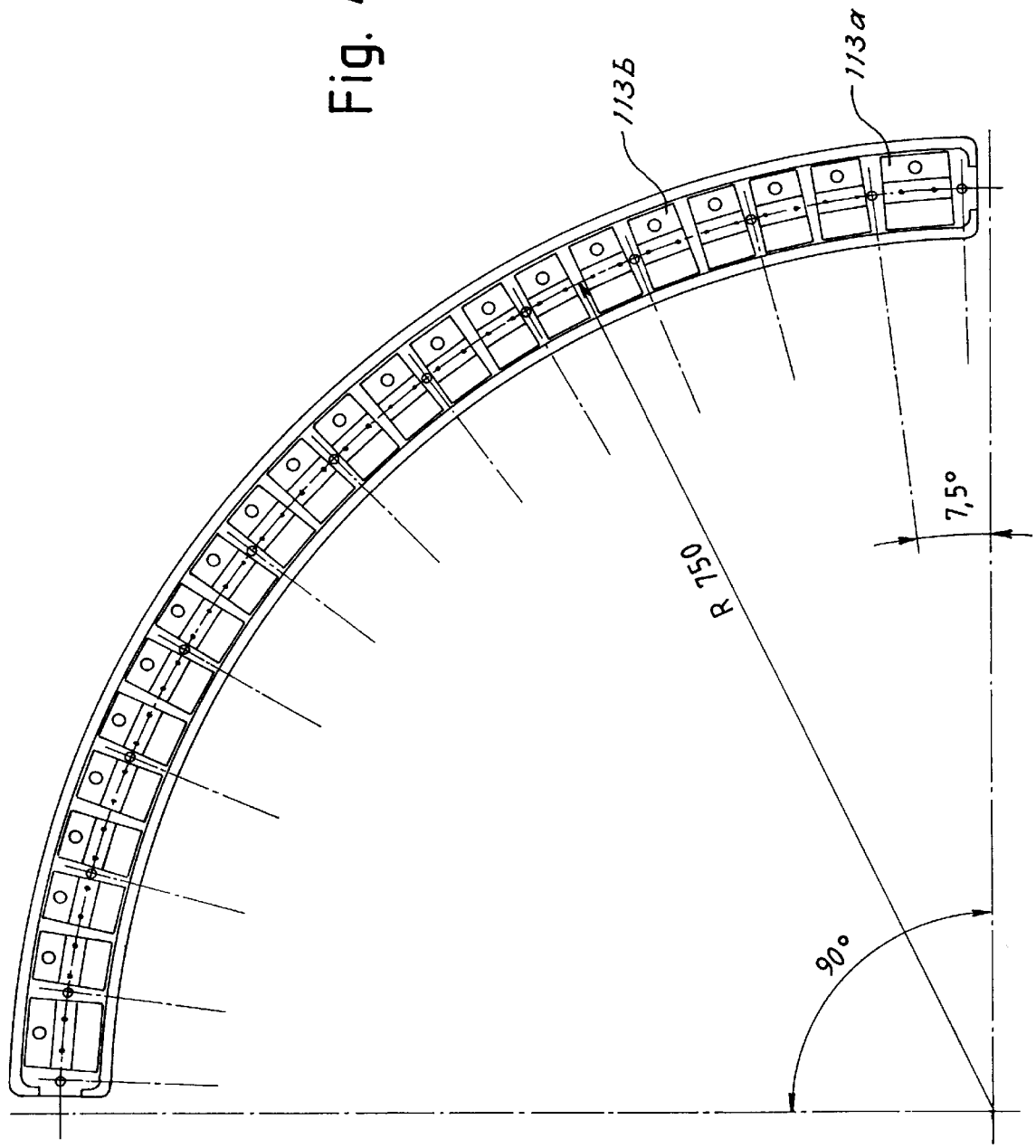
FIGS. 4–6 are diagrammatic views of various curves in accordance with the invention.
Figure 5:
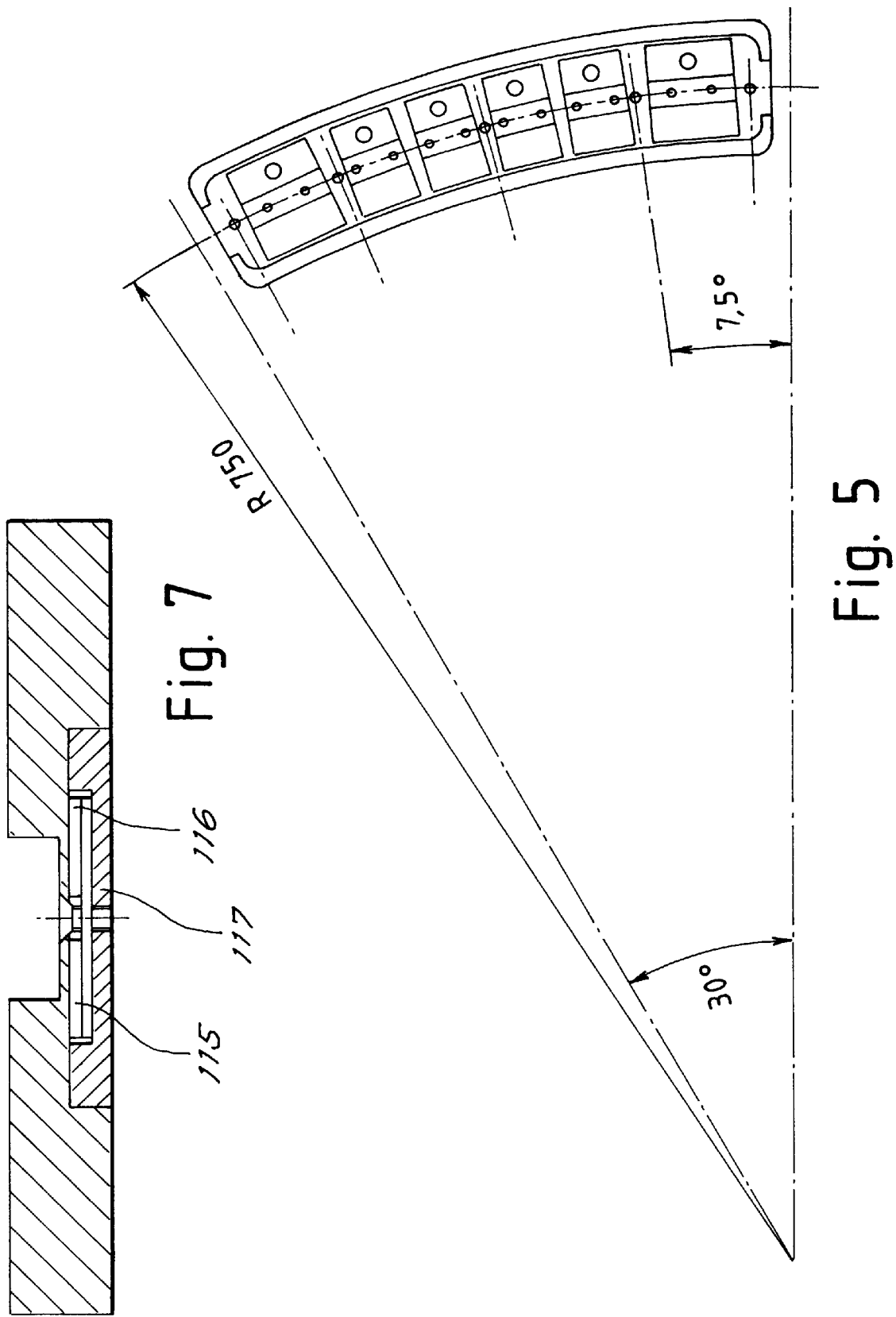

Shown in FIG. 4 is another embodiment in accordance with the invention having a radius of curvature R750, instead of the radius of curvature R860 of FIG. 2. As can be seen, in the curve (shown for the sake of convenience with the upper sliding channel removed) the same typologies of magnets 113a and 113b are employed thereby obtaining an equally satisfactory distribution of the magnetic field. Shown in FIG. 5 is a further embodiment in accordance with the invention, which has a reduced angular extension relative to the preceding embodiments. It can be immediately seen that in the curve in FIG. 5 (which for the sake of convenience is also shown with the upper sliding channel removed) the same typologies of magnets 113a and 113b are still used, in this case too an equally satisfactory distribution of the magnetic field being achieved.

Figure 6:
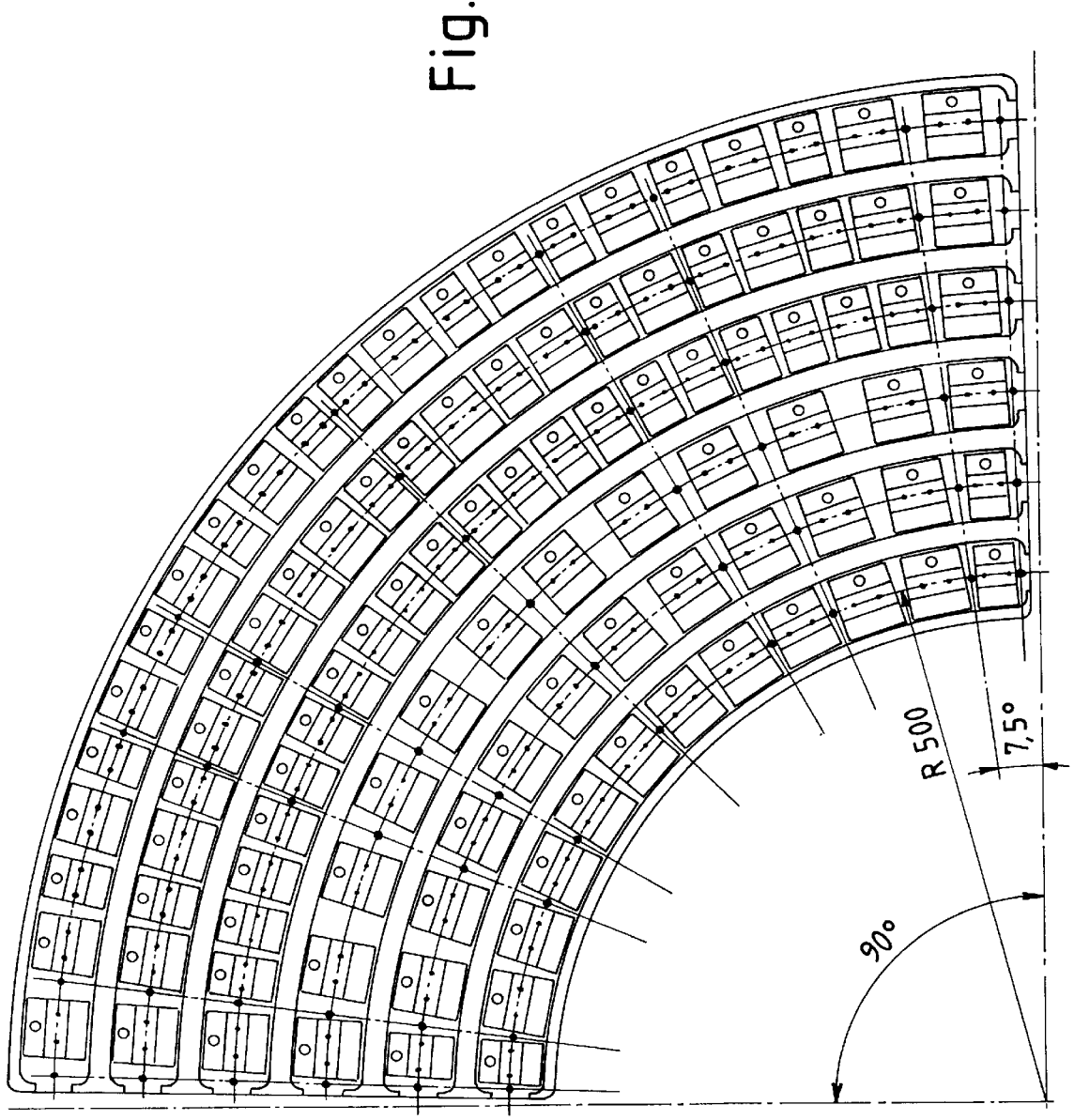

A still further embodiment in accordance with the invention referred to a six-channel multi-path curve is shown in FIG. 6. As can be immediately seen, by still employing only two typologies of magnets 113a, 113b a satisfactory distribution for all the curve paths can be obtained.

At this point it is apparent that the intended purposes are achieved. The above described innovative curves can all belong to a single series of curves, different in length, radius of curvature, number of paths of travel, but all provided with the same two typologies of magnets. Obviously, the above description of embodiments applying the innovative principles of the present invention is given for purposes of illustration only and therefore must not be considered as a limitation of the scope of the invention as herein claimed. For example, the number of paths, the angular and transverse extensions can vary depending on the specific requirements.

What is claimed is:

1. A magnetic curve for chain conveyors, comprising at least one path of travel and holding grooves for a plurality of magnets, wherein in the extension direction of the curve the magnets of the magnet plurality are housed in a continuous groove associated with said path of travel and the plurality of magnets is divided at least into magnets of a first length and magnets of a second length.

2. A magnetic curve as claimed in claim 1, wherein the lengths Lm of the employed magnets satisfy the relation:

$$1 < L/Lm <= 5$$

wherein L is the longest magnet among all magnets present in the magnet plurality.

3. A magnetic curve as claimed in claim 1, wherein it comprises several paths of travel, each provided with an associated continuous groove for holding magnets of said magnet plurality.

4. A magnetic curve as claimed in claim 1, characterised in that magnet distribution takes place in such a manner that, by ideally dividing the whole curve into circular sectors being multiples of a preestablished angle, the magnets of different length are distributed in each sector so that they do not fall astride the division.

5. A magnetic curve as claimed in claim 3, wherein said angle is included between 6.5° and 9°, being in particular about 7.5°.

6. A magnetic curve as claimed in claim 1, wherein each magnet is formed of a pair of magnet elements mounted on two ends of a support plate made of ferromagnetic material and extending transversely of the path of travel.

7. A magnetic curve as claimed in claim 1, characterised in that magnets are distributed along the curve extension to provide a field oscillation not exceeding +-50% of the average value, substantially along the whole curve extension.

8. A magnetic curve as claimed in claim 1, wherein magnets are spaced apart no more than half their length from each other.

9. A series of magnetic curves for chain conveyors, the curves being different from each other in length, radius of curvature, number of paths of travels, each curve comprising at least one path of travel and holding grooves for a plurality of magnets, in the extension direction of the curve the magnets of the magnet plurality being housed in a continuous groove associated with said path of travel and the plurality of magnets being divided at least into magnets of a first length and magnets of a second length, said first and second lengths being the same for all curves of the series.

* * * * *